Figure 1:
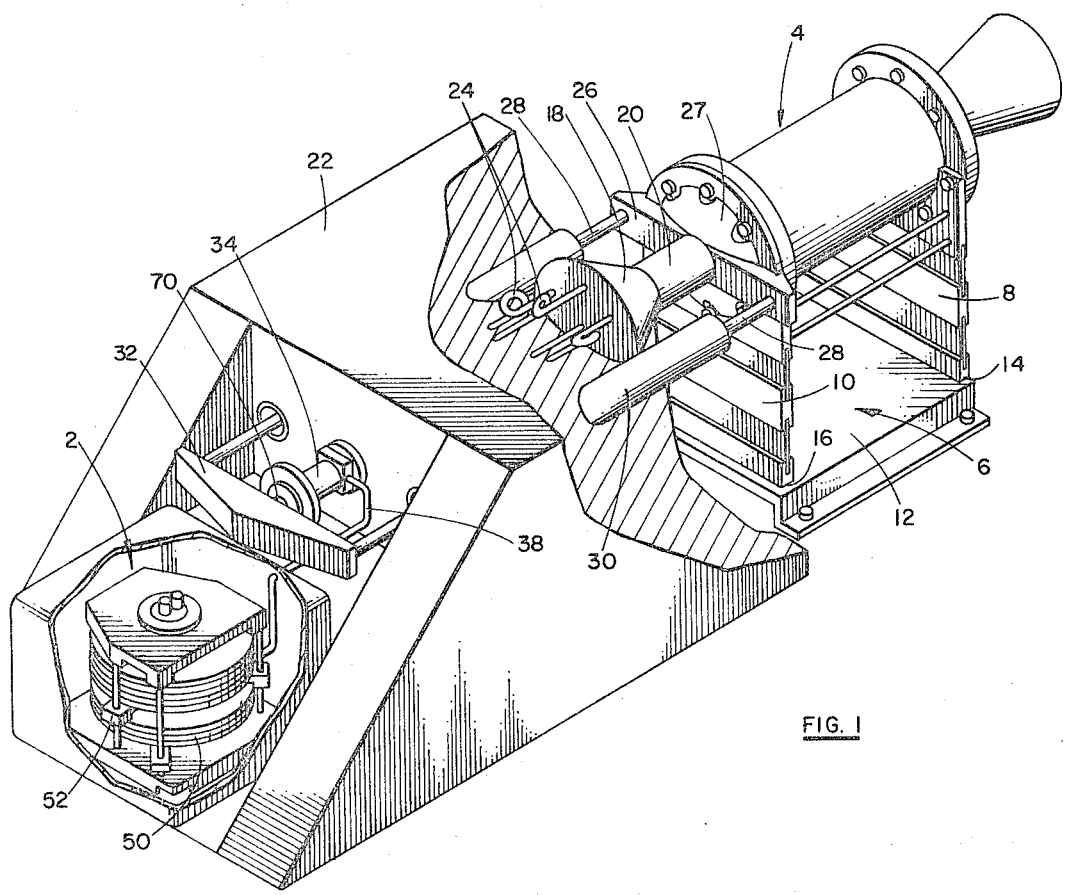

INVENTORS
ROBERT A. RICH
BY GEORGE A. HOOD

Donald W. Graves
ATTORNEY

3,301,038
THRUST MEASUREMENT CALIBRATOR
Robert A. Rich, Canoga Park, and George A. Hood, Van Nuys, Calif., assignors to North American Aviation, Inc.
Filed Jan. 2, 1964, Ser. No. 334,978
1 Claim. (Cl. 73—1)

This invention relates to a calibrating system for thrust measurement devices.

More particularly, this invention relates to a calibrating system wherein a load cell which receives the thrust of a rocket engine in a test stand may be calibrated from a remote location immediately preceding and/or following a rocket engine test.

Developments in recent years, particularly in the field of rocket engines and their control, has ushered in the space age. This had lead to a great emphasis on development of propulsion devices. The design of rocket engines and other propulsion devices is an exacting science and is rendered particularly difficult when exact thrust levels and duration thereof must be calculated to a degree far more exacting than that known in the past. An example of this is the necessity for orbiting a given pay load through a predetermined orbit which necessitates the provision of engines which can give the calculated thrust within small tolerances.

It is not a simple matter, however, to correlate the predicted or calculated thrust with that actually obtained when the engine is fired. It is accordingly necessary that the engines as they are developed be subjected to tests whereby the actual thrust levels can be determined. This has led to the development of load cells or pressure transducers which are subjected to the engine's thrust whereby a measurement of the thrust can be made. However, the calibration of prior art transducers suffer several disadvantages which will become apparent as this description proceeds.

Typical prior art force transducers utilized in rocket engine thrust testing include the pendulum type and other types of load cells which have strain gages mounted thereon. These gages measure the stress in the load cell which can be correlated to the force applied to the load cell.

One of the biggest problems in measuring thrust through a load cell is the calibration of the load cell itself. Thus, while the load cell may be sensitive to thrust and indicate a measurement of say 10,000 pounds of thrust, in actuality, the thrust may be in the neighborhood of 1,000 pounds more or less due to several factors which affect the load cell. Accordingly, it becomes necessary to accurately calibrate the load cell through some means or other. This is typically done by a ballistic pendulum, a proving ring or the so-called fracture link technique. Unfortunately, all of these load cells over a period of time due to temperature changes or other factors will "drift" or merely change their characteristics which will give an erroneous reading of thrust. Also, all of these devices suffer the disadvantage in that a great amount of time may elapse between when the load cell is calibrated and the rocket engine is tested. After the test has been completed, another great lag occurs before the load cell can again be calibrated. Therefore, the load cell is subject to errors in reading due to the changes in temperature, barometric pressure, stresses not ordinarily present, hysterisis and drift. It is to obviate the disadvantages of the prior art calibration devices that this invention is directed.

Briefly, the invention includes a hydraulic dead weight tester and a piston cylinder arrangement. By placing precisely known weights on the dead weight tester, the resultant pressure is hydraulically transferred to a hydraulic piston cylinder arrangement which will then place the load cell in compression. This is done remotely through a system of tension rods so that immediately preceding and/or subsequent to a rocket engine test, the calibrating system may be employed so that a direct reading of the load cell may be received and correlated with the known weights placed on the dead weight tester and the readings of the load cell compared to this known weight. Thus, any variations in the load cell reading which may occur due to temperature, drift and other changes are compensated for immediately preceding or subsequent to the test.

An object of this invention is to provide an improved calibrating system for load cells and the like.

Figure 2:
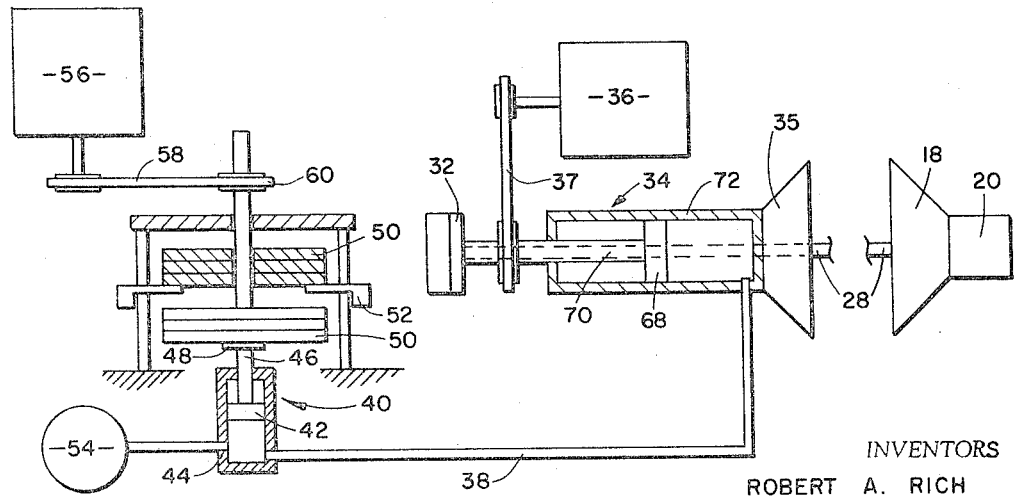

Other advantages and objects of this invention will become apparent as this description proceeds taken in conjunction with the drawings in which:

FIG. 1 is a perspective view partially in cross-section showing the load cell calibrating system, load cell and rocket engine to be tested, and FIG. 2 is a schematic view of the load cell calibrating system illustrating the operation of the device.

Referring to FIG. 1, indicated generally as 2, is the load cell calibrating system according to this invention. A rocket engine to be tested is shown generally at 4, which is mounted on test stand supports 6. Test stand 6 includes supports 8 and 10 which are mounted on base 12. Flexures 14 and 16 are provided so that the vertical supports 8 and 10 are free to pivot thereabout. This arrangement allows the rocket engine 4 to move freely in a direction which is parallel to its longitudinal axis but prevents transverse movement, rotational movement and vertical movement. Thus, only one degree of freedom is present. The purpose of this arrangement is to hold the engine in place while allowing no resistance to movement in the direction of thrust.

Shown at 18 is a thrust block which supports load cell 20. Load cell 20 has mounted thereon strain gage elements which may be of the semi-conductor type. These are not shown since this is a standard load cell. Shown at 22 is an abutment which is shown as made of concrete. This abutment supports compressive loads transferred through load cell 20 and thrust block 18. Rods 24 are provided to support block 18 through concrete abutment 22. Shown at 26 is a horizontal supporting member which is a part of cap 27 and is attached to longitudinal rods 28. These longitudinal rods pass through the abutment and are free to move axially relative thereto due to sleeves 30 which loosely surround rods 28. These rods, after passing through the abutment, connect to horizontal bar 32 which is attached to piston rod 70 (see FIG. 2) of hydraulic piston and cylinder assembly 34. Assembly 34 is horizontal so as to eliminate any gravity effect of the piston. This arrangement allows any movement of the piston 68 to transfer a load to the load cell 20 by means of bar 32, tension rods 28 and bar 26. Assembly 34 is supported in abutment 22 by means of support 35.

Shown generally at 36 is a motor which is connected to the piston by means of a belt 37 so that when the motor rotates, the piston likewise will rotate to prevent drag between the piston and the cylinder. A hydraulic line 38 is shown which leads to the dead weight testing portion of the invention which is shown schematically in FIG. 2. This dead weight tester is designated generally as 40 and includes a piston 42 and cylinder 44. Connected to the piston 42 is a piston rod 46 having mounted thereon a collar 48. This collar 48 is adapted to support weights 50 which preferably are equal to the other weights 50 shown. A selecting mechanism 52 supports weights above the piston rod so that the weights thereof are not transferred to the piston. By means of a suitable control mechanism, the supporting means 52 may be moved in or out selectively so that any number of weights 50 may be placed on the piston through collar 48. As shown in FIG. 2, three weights are supported on collar 48 while three weights are shown as being supported on the selecting mechanism 52. Shown generally at 54 is a pump which when activated will pump fluid into the hydraulic system as needed. As in the case of the piston cylinder assembly, the dead weight tester 40 also has a motor 56 which will rotate the piston and piston rod through a belt 58 connected to a pulley 60 located on the piston rod 46. When the motor 56 and 36 are actuated, the respective pistons and piston rods will rotate to prevent a binding between the cylinders and pistons. The hydraulic fluid is preferably a hydraulic oil. The hydraulic fluid used in this system is a light steam turbine oil having a viscosity index of 108, and API gravity index of 31.8 degrees. The impurities present are kept to a minimum. By lapping the pistons and cylinders precisely, the need for seals between the pistons and cylinders is obviated. The pistons and their respective cylinders are made of materials having the same coeffiicent of thermal expansion. This obviates effects due to temperature changes. The apparatus operates as follow. When the load cell 20 is loaded in compression by either the load calibrating device according to this invention or the engine itself, a reading will occur which may be read from any suitable recording device and may even include a digital volt meter properly indexed. By placing a selected number of weights 50 on the collar 48, a definite load will be transferred to the piston rod 46. By providing a precisely measured piston cross-sectional area, the pressure in the hydraulic lines 38 will be known by dividing the known force by the area of the piston 42. This force will be transferred to cylinder and piston assembly 34 which includes piston 68, piston rod 70 and cylinder 72. Thus, if the area of piston 68 is precisely known, it is readily calculated what the force exerted on piston rod 70 will be. This force is, in turn, transferred through bar 32 and hence tension rods 28. This force is transferred to the bar 26, and hence load cell 20 which is held in position by the concrete abutment 22 and block 18. Since the force exerted on the load cell is known (from the hydraulic system), this can be compared to the readout of the load cell itself so that the scale may be corrected to indicate the true load. This will give one point on the scale. To obtain other points on the scale, other weights are placed on the collar 48 so that a pluarity of points are established between which other loads can be interpolated. The area of piston 68 is substantially larger than piston 42. Thus, assuming for example that the area of piston 68 is forty times that of piston 42 and weight 50 is one hundred pounds, the force exerted on cell 20 would equal four thousand pounds which allows the use of small weights to obtain relatively large thrust levels.

Immediately after the exact points on the scale are established, the calibrating system is deactivated, the engine fired and the thrust therefrom transferred to load cell 20. With this system, therefore, there is no need for a separate calibrating structure in that the system can be calibrated immediately with the rocket engine in place thus obviating any drift, hysterisis, changes due to temperature or pressure and other factors. This provides an immediate indication of the characteristics of the system substantially at the time that the test is run.

While the preferred embodiment of the present invention has been shown and described herein, it is obvious that many structural details may be changed without departing from the spirit and scope of the appended claim.

We claim:

A calibrating system for load cells and the like comprising;
  a first piston and cylinder assembly, said piston being closely fitted within said cylinder and having a precisely known cross-sectional area,
  means to apply precisely known forces on said first piston,
  a second piston and cylinder assembly, said second piston being closely fitted within said second cylinder and having a precisely known cross-sectional area,
  means adapted to contain fluid and expose said fluid to each of said pistons whereby when said first piston is subjected to said force, said fluid will transfer pressure to said second piston,
  tension rods attached to said second piston,
  a load cell, a supporting member abutting said load cell and attached to said tension rods whereby when said second piston is actuated by said precisely known forces on said first piston, said load cell will be compressed by said supporting member, said supporting member and said load cell being adapted to receive and indicate thrust from a rocket engine abutting said supporting member, and
  a substantially incompressible mass extending between said second piston and said load cell and maintaining said load cell in fixed position, said tension rods freely passing through said mass.

References Cited by the Examiner

UNITED STATES PATENTS

| | | | |
|---|---|---|---|
| 2,075,968 | 4/1937 | Heydekampf | 73—93 |
| 2,766,612 | 10/1956 | Michels | 73—4 |
| 3,028,745 | 4/1962 | Muires | 73—4 |
| 3,062,046 | 11/1962 | Evans | 73—1 XR |
| 3,190,108 | 6/1965 | Ormond | 73—1 |
| 3,194,050 | 6/1965 | Ruge | 73—1 |

LOUIS R. PRINCE, *Primary Examiner.*

S. C. SWISHER, *Assistant Examiner.*